United States Patent
Low et al.

(10) Patent No.: US 12,316,725 B2
(45) Date of Patent: May 27, 2025

(54) DOWNLINK PROTOCOL ALIGNMENT AND DECODING

(71) Applicant: GREATER SHINE LIMITED, New Taipei (TW)

(72) Inventors: Su-Lin Low, San Diego, CA (US); Tianan Tim Ma, San Diego, CA (US); Hausting Hong, San Diego, CA (US); Hong Kui Yang, San Diego, CA (US); Jian Gu, San Diego, CA (US); Anna Gontar, San Diego, CA (US)

(73) Assignee: GREATER SHINE LIMITED, New Taipei (TW)

( * ) Notice: Subject to any disclaimer, the term of this patent is extended or adjusted under 35 U.S.C. 154(b) by 475 days.

(21) Appl. No.: 17/870,716

(22) Filed: Jul. 21, 2022

(65) Prior Publication Data

US 2022/0360652 A1  Nov. 10, 2022

Related U.S. Application Data

(63) Continuation of application No. PCT/IB2020/058542, filed on Sep. 15, 2020.

(60) Provisional application No. 62/964,066, filed on Jan. 21, 2020.

(51) Int. Cl.
 H04L 69/324 (2022.01)
 H04L 1/00 (2006.01)

(52) U.S. Cl.
 CPC .......... *H04L 69/324* (2013.01); *H04L 1/0061* (2013.01)

(58) Field of Classification Search
 CPC .......................... H04L 69/324; H04L 1/0061
 See application file for complete search history.

(56) References Cited

U.S. PATENT DOCUMENTS

| | | |
|---|---|---|
| 2010/0232356 A1* | 9/2010 | Maheshwari ......... H04L 1/1896 370/328 |
| 2013/0229996 A1 | 9/2013 | Wang et al. |
| 2014/0269689 A1 | 9/2014 | Sabato |
| 2014/0307563 A1 | 10/2014 | Kanamarlapudi et al. |
| 2016/0365952 A1 | 12/2016 | Kim et al. |
| 2017/0006360 A1 | 1/2017 | Gareau |

(Continued)

FOREIGN PATENT DOCUMENTS

| | | |
|---|---|---|
| CN | 103502985 A | 1/2014 |
| CN | 109743752 A | 5/2019 |
| WO | 2012006311 A1 | 1/2012 |

OTHER PUBLICATIONS

OPPO, "Left issues on UL-SL prioritization for NR-V2X", 3GPP TSG-RAN WG2 Meeting #108 R2-1914463, Nov. 18-Nov. 22, 2019. 7 pages.

(Continued)

*Primary Examiner* — Basil Ma

(74) *Attorney, Agent, or Firm* — BAYES PLLC

(57) ABSTRACT

An apparatus and method for downlink data transmission and decoding are disclosed. In the method, a physical layer code block or a physical layer code block group is decoded. A medium access control (MAC) sub-packet corresponding to the decoded physical layer code block or the physical code block group is decoded without waiting for any subsequent physical layer code blocks to be decoded. The decoded MAC sub-packet is passed up a protocol stack.

19 Claims, 7 Drawing Sheets

(56) References Cited

U.S. PATENT DOCUMENTS

2018/0007561 A1     1/2018    Adachi et al.
2024/0106573 A1*   3/2024    Botsinis ................ H04L 1/1812

OTHER PUBLICATIONS

Cheng Cheng, "Design and implementation of random access process in MAC layer of LTE protocol stack", China Scibnce and Technology Information Feb. 2011.http://43.138.60.40/kns8/defaultresult/index. 9 pages with English translation.

First Office Action of the Chinese application No. 202080094118.9, issued on Apr. 27, 2023. 25 pages with English translation.

International Search Report in the international application No. PCT/IB2020/058542, mailed on Feb. 11, 2021, 3 pages.

Written Opinion of the International Search Authority in the international application No. PCT/IB2020/058542, mailed on Feb. 11, 2021, 13 pages.

Second Office Action of the Chinese application No. 202080094118.9, issued on Sep. 1, 2023. 19 pages with English translation.

Anonymous:"5G NR MAC layer-architecture,channel mapping,procedures,header,subheaders",Jun. 8, 2019 (Jun. 8, 2019), pp. 1-9, XP093009306,Retrieved from the Internet:URL:https://web.archive.org/web/20190608172210/http://www.rfwirelessworld.com/5G/5G-NR-MAC-layer-overview.html[retrieved on Dec. 19, 2022].

Extended European Search Report in the European application No. 20915256.0, mailed on Jan. 3, 2023.

Xu Ning, "Air interface evolution for cellular mobile communication systems—LTE, LTE-A, LTE Pro and 5G",Oct. 31, 2017, Beijing University of Posts and Telecommunications Press, p. 60, 26 pages with English translation.

Wei Chuqian, "Code division multiple access mobile communication system", Jan. 31, 2008, Published by National Defense Industries Press, p. 180, 24 pages with English translation.

Notice of Rejection of the Chinese application No. 202080094118.9, issued on Jan. 5, 2024, 19 pages with English translation.

* cited by examiner

DOWNLINK PROTOCOL ALIGNMENT AND DECODING

CROSS-REFERENCE TO RELATED APPLICATION

This application is a continuation application of International Application No. PCT/IB2020/058542, filed on Sep. 15, 2020, which claims the benefit of priority to U.S. Provisional Application No. 62/964,066, filed Jan. 21, 2020, entitled "METHOD FOR 5G DL MAC FOR FAST DECODING AT UE IN HIGH DATARATE PACKET TRANSFER," both of which are hereby incorporated by reference in their entireties.

BACKGROUND

Embodiments of the present disclosure relate to apparatus and methods that may be used to communicate data according to an aligned protocol structure.

Wireless communication systems are widely deployed to provide various telecommunication services such as telephony, video, data, messaging, and broadcasts. Various wireless communication systems rely on communication of data using various wireless protocols. For example, in a 5th-generation (5G) communication system, an access node may transmit user plane (UP) and/or control plane (CP) data in packets to one or more user equipment (UE) devices. The user equipment devices may be responsible for decoding data from the packets.

SUMMARY

Embodiments of methods and apparatus that may be used to communicate and decode data packets are disclosed herein.

In one example, an apparatus can include at least one processor and at least one memory including computer program code. The at least one memory and the computer program code can be configured to, with the at least one processor, cause the apparatus at least to decode a physical layer code block or a physical layer code block group. The at least one memory and the computer program code can also be configured to, with the at least one processor, cause the apparatus at least to decode a medium access control (MAC) sub-packet corresponding to the decoded physical layer code block or the physical code block group without waiting for any subsequent physical layer code blocks to be decoded. The at least one memory and the computer program code can further be configured to, with the at least one processor, cause the apparatus at least to pass the decoded MAC sub-packet up a protocol stack.

In another example, a method for code block processing can include decoding a physical layer code block or a physical layer code block group. The method can also include decoding a MAC sub-packet corresponding to the decoded physical layer code block or the physical code block group without waiting for any subsequent physical layer code blocks to be decoded. The method can further include passing the decoded MAC sub-packet up a protocol stack.

In a further example, an apparatus can include at least one processor and at least one memory including computer program code. The at least one memory and the computer program code can be configured to, with the at least one processor, cause the apparatus at least to align a sub-packet with a physical layer boundary. A packet can include the sub-packet and a plurality of other sub-packets. The at least one memory and the computer program code can also be configured to, with the at least one processor, cause the apparatus at least to forward for transmission the sub-packet bounded by the physical layer boundary.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
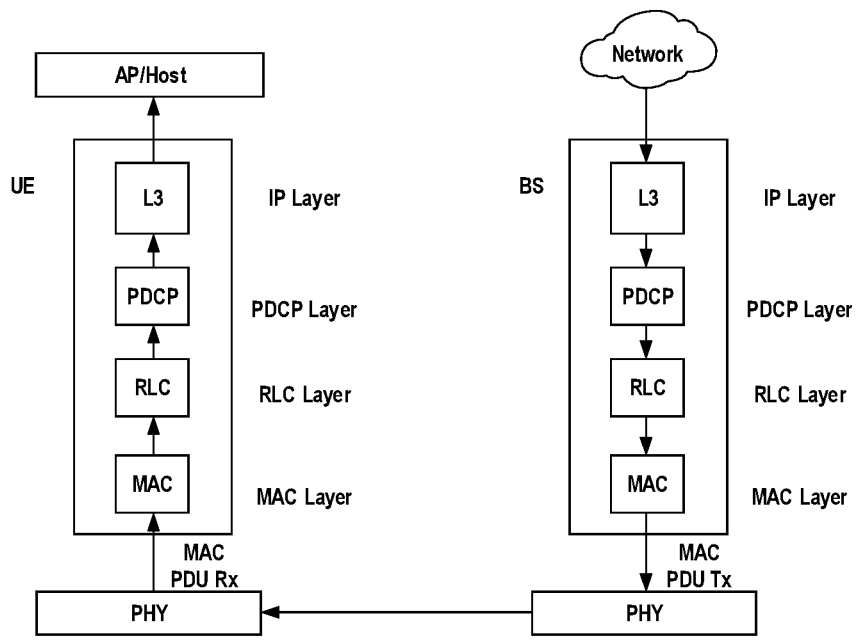
FIG. 1 illustrates a protocol stack in a communication system.

Embodiments of the present disclosure will be described with reference to the accompanying drawings.

DETAILED DESCRIPTION

Although specific configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure or characteristic is described in connection with an embodiment, it would be within the knowledge of a person skilled in the pertinent art to effect such feature, structure or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of wireless communication systems will now be described with reference to various apparatus and methods. These apparatus and methods will be described in the following detailed description and illustrated in the accompanying drawings by various blocks, modules, units, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various wireless communication networks such as Long Term Evolution (LTE) system, code division multiple access (CDMA) system, time division multiple access (TDMA) system, frequency division multiple access (FDMA) system, orthogonal frequency division multiple access (OFDMA) system, single-carrier frequency division multiple access (SC-FDMA) system, and other networks. The terms "network" and "system" are often used interchangeably. A CDMA network may implement a radio technology such as Universal Terrestrial Radio Access (UTRA), CDMA 2000, etc. UTRA includes Wideband CDMA (WCDMA) and other variants of CDMA. CDMA 2000 covers IS-2000, IS-95, and IS-856 standards. A TDMA network may implement a radio technology such as Global System for Mobile Communications (GSM). An OFDMA network may implement a radio technology such as new radio (NR) (e.g., 5G RAT), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the wireless networks and radio technologies mentioned above as well as other wireless networks and radio technologies.

FIG. 1 illustrates a protocol stack in a communication system. As shown in FIG. 1, in a 5G cellular wireless communication system, the protocol stack can include the Internet protocol (IP) layer (also known as Layer 3 (L3)), the packet data convergence protocol (PDCP) layer, the radio link control (RLC) layer, the media access control (MAC) layer, and the physical (PHY) layer. Each layer is responsible for processing packet data and ensuring that data transmission is secure, on-time, and error-free. Both the control plane and user plane data can be transmitted using the protocol stack.

In the downlink (DL) direction, incoming packet data from in the form of IP packets corresponding to a protocol data unit (PDU) session may arrive from the network at the Layer 3 protocol stack. These IP packets may have been originally generated by a remote terminal device, by a core network element, or by an access node or other base station (BS). The received IP packets may be processed by each of the layers in order and ultimately passed to the PHY layer for MAC PDU transmission (Tx) over the air to a user equipment (UE).

For example, the base station can prepare packets incoming from the network by encapsulating L3 IP packets into PDCP packets after PDCP processing of header compression, integrity checking, and ciphering. The PDCP packets can then be transferred to the RLC layer for datalink layer control and error recovery. The 5G PDCP PDUs can be encapsulated to one RLC frame, which can be packaged into one MAC sub-protocol data unit (MAC SubPDU) packet (referred herein as "MACSubPDUs" as well) as well. At the MAC layer, these MACSubPDUs can be concatenated into one MAC PDU for the PHY transport block (TB). The PHY layer can then break down the transport block into multiple code blocks (CB) for individual channel coding and further transmission processing.

Thus, according to one approach, each 5G MACSubPDU packet can be constructed from one IP packet mapped to one PDCP PDU, and one RLC PDU. Then, once the MACSubPDUs are concatenated into one transport block and sent to the PHY layer. The PHY layer processes this one transport block, adds cyclic redundancy check (CRC), and segment the one transport block into code blocks with fixed segment sizes. The code blocks can then be appended with CRC bits, and go through channel coding and further transmission processing.

At the user equipment side, MAC PDU reception (Rx) at the PHY layer may result in the packets being processed and sequentially passed up the protocol layer of the user equipment. Ultimately, the packets may be passed to an external application processor (AP) or a host (e.g., through universal serial bus (USB) or peripheral component interconnected express (PCIe)).

Thus, at the user equipment side, the PHY layer decodes each code block of the transport block and forwards the transport block to the MAC layer. In the absence of alignment, the MAC layer decodes each of the MACSubPDUs after concatenating several code blocks and finding the boundary of each MAC SubPDU. The MAC layer then forwards the payload to the RLC layer, which decodes further and forwards the packet to PDCP layer and beyond for PDCP and L3 processing.

A challenge in the DL MAC reception is that at the user equipment, the MAC layer may need to wait for multiple PHY code blocks to be received and concatenated before the MAC layer can find the boundary of the MACSubPDU packet for further decoding. This introduces a delay in decoding. In some cases, the PHY layer may not be able to receive one or more of the missing code blocks in between, resulting in DL decode failure of the MAC SubPDU and packet reception errors.

In such an approach, the MACSubPDU is not aligned to the code block boundary. The non-alignment may result in various effects on the user equipment side. For example, the non-alignment may result in a delay in forming MACSubPDUs from code blocks, frequent transmission errors, large memory storage needed for code block reassembly and concatenation, and increased power due to large memory storage and more processing work. These impacts may be present at the user equipment side and may also have an impact on the base station side in the form of additional requests for repeated transmission or the like.

In certain embodiments of the present disclosure, fast decoding of DL MAC packets received at the user equipment can be facilitated by a method for the composition of 5G DL MAC packets for data transmission at the base station. For example, in certain embodiments, the base station can package and transmit each DL MAC SubPDU packet aligned with the PHY layer code block boundary at the base station. At the user equipment, once each PHY code block is decoded successfully, the MACSubPDU can be decoded immediately and passed up to the RLC layer and above. Such an approach may eliminate waiting for multiple PHY code blocks to be received and decoded and may eliminate the risk of discarding the whole MACSubPDU packet in the case that even one code block is missing.

One aspect of certain embodiments is a one-to-one mapping of each physical code block to a corresponding MAC-SubPDU. At the BS PHY layer, each PHY transport block may be segmented into code blocks, where the code block size is given to the MAC layer to compose one MACSub-PDU that fits exactly in one PHY code block. Thus, for example, there may be communication between the MAC layer and the PHY layer to ensure the MAC composes the MACSubPDU appropriately.

According to another aspect of certain embodiments, one PDCP packet may be transmitted in multiple RLC Segments mapped to code blocks. If the PDCP PDU is larger than a code block size, the PDCP PDU may be segmented into RLC segments before transmission, each fitting into the constraints of one MACSubPDU per code block, taking into account the headers in the RLC segment and MAC SubPDU. In this case, while there may not be a one-to-one mapping of PDCP packet to a code block, there may still be a one-to-one mapping between code block and MAC Sub-PDU. Moreover, the first RLC segment of the PDCP PDU may be aligned with the start of one of the code blocks.

According to yet another aspect of certain embodiments, a user equipment can perform streamlined decoding of code blocks to RLC segment reassembly. At the equipment, decoding of each successful PHY CB received can be streamlined to the MAC layer for immediate decoding of the MACSubPDU and the RLC Segment, and so on to RLC segment reassembly into a PDCP packet. In the case where a single PDCP packet is composed of multiple MACSubP-DUs, the PDCP packet reassembly may only require waiting until exactly the number of code blocks corresponding to the MACSubPDUs have been received.

Figure 2:
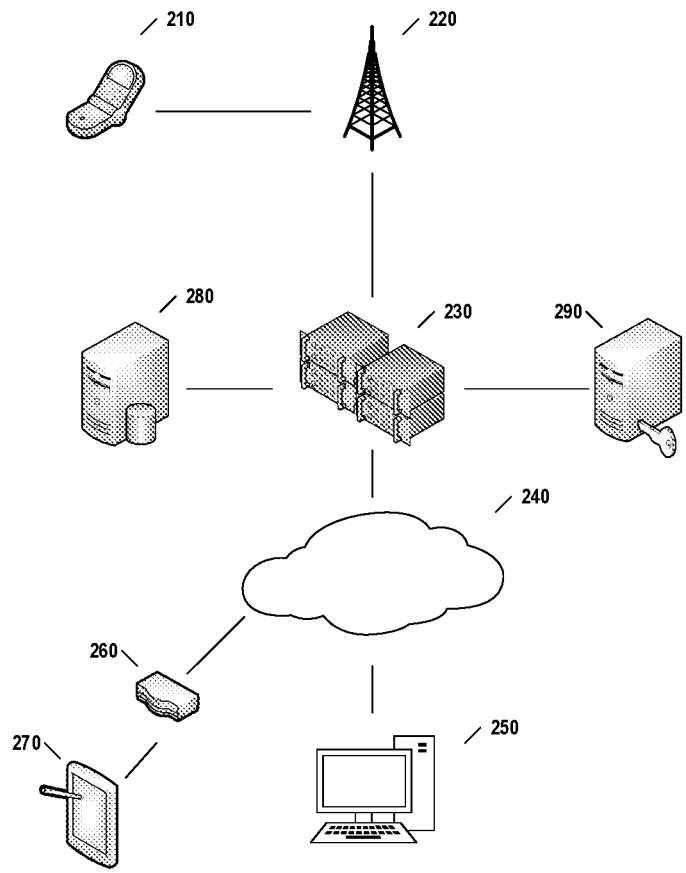
FIG. 2 illustrates an exemplary wireless network according to certain embodiments of the present disclosure.

FIG. 2 illustrates an exemplary wireless network 200, such as an NR or 5G network, in which aspects of the present disclosure may be performed, for example, for enabling efficient downlink data transmission, as described in greater detail below. As shown in FIG. 2, wireless network 200 may include a network of nodes, such as a user equipment 210, an access node 220, and a core network element 230. User equipment 210 may be any terminal device, such as a smart phone, personal computer, laptop computer, tablet computer, vehicle computer, wearable electronic device, smart sensor, or any other device capable of receiving, processing, and transmitting information, such as any member of a vehicle to everything (V2X) network, a cluster network, a smart grid node, or an Internet-of-Things (IoT) node. Other devices are also permitted. User equipment 210 is illustrated as a smart phone simply by way of illustration and not by way of limitation.

An access node 220 may be a device that communicates with the user equipment 210, such as a wireless access point, a base station, an enhanced Node B (eNB), a cluster master node, or the like. Access node 220 may have a wired connection to user equipment 210, a wireless connection to user equipment 210, or any combination thereof. Access node 220 may be connected to user equipment 210 by multiple connections, and user equipment 210 may be connected to other access nodes in addition to access node 220. Access node 220 may also be connected to other user equipment. Access node 220 is illustrated by a radio tower by way of illustration and not by way of limitation.

A core network element 230 may serve access node 220 and user equipment 210 to provide core network services. Examples of a core network element 230 include a home subscriber server (HSS), a mobility management entity (MME), a serving gateway (GW), a packet data network (PDN) GW. These are examples of core network elements of an evolved packet core (EPC) system, which is a core network for the LTE system. Other core network elements may be used in LTE and other communication systems. Core network element 230 is shown as a set of rack-mounted servers by way of illustration and not by way of limitation.

Core network element 230 may connect with a large network, such as the Internet 240, or another IP network, to communicate packet data over any distance. In this way, data from user equipment 210 may be communicated to other user equipment connected to other access points, including, for example, a personal computer 250 connected to Internet 240, for example, using a wired connection, or a tablet 270 connected to Internet 240 via a router 260. Thus, personal computer 250 and tablet 270 provide additional examples of possible user equipment devices, and router 260 provides an example of another access point device.

A generic example of a rack-mounted server is provided as an illustration of core network element 230. However, there may be multiple elements in the core network including database servers, such as database 280 and security and authentication servers, such as authentication server 290. Database 280 may, for example, manage data related to user subscription to network services. A home location register (HLR) is an example of a standardized database of subscriber information for a mobile network. Likewise, authentication server 290 may handle authentication of users, sessions, and so on. In 5G, an authentication server function (AUSF) may be the specific entity to perform user equipment authentication. In certain embodiments, a single server rack may handle multiple such functions, such that the connections between core network element 230, authentication server 290, and database 280 may be local connections within a single rack.

Certain embodiments of the present disclosure may be implemented in a modem of a user equipment, such as user equipment 210, tablet 270, or personal computer 250. For example, a modem or other transceiver of user equipment 210 may be scheduled for transmission by a communication from access node 220. As described below in detail, user equipment 210 may prepare in advance of receiving a service grant that schedules transmission and then may finalize one or more MAC PDU based on the service grant.

Each of the elements of FIG. 2 may be considered a node of a communication network. More detail regarding the possible implementation of communication nodes is provided by way of example in the description of FIG. 10 and node 1000 below. For example, user equipment 210 in FIG. 2 may be implemented as node 1000 shown in FIG. 10.

Figure 3:
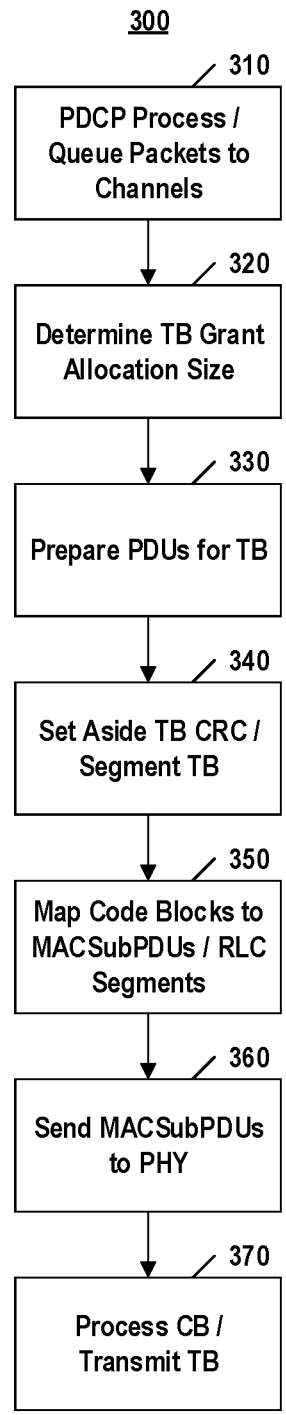
FIG. 3 illustrates an exemplary method for efficient data transmission according to certain embodiments of the present disclosure.
Figure 4:
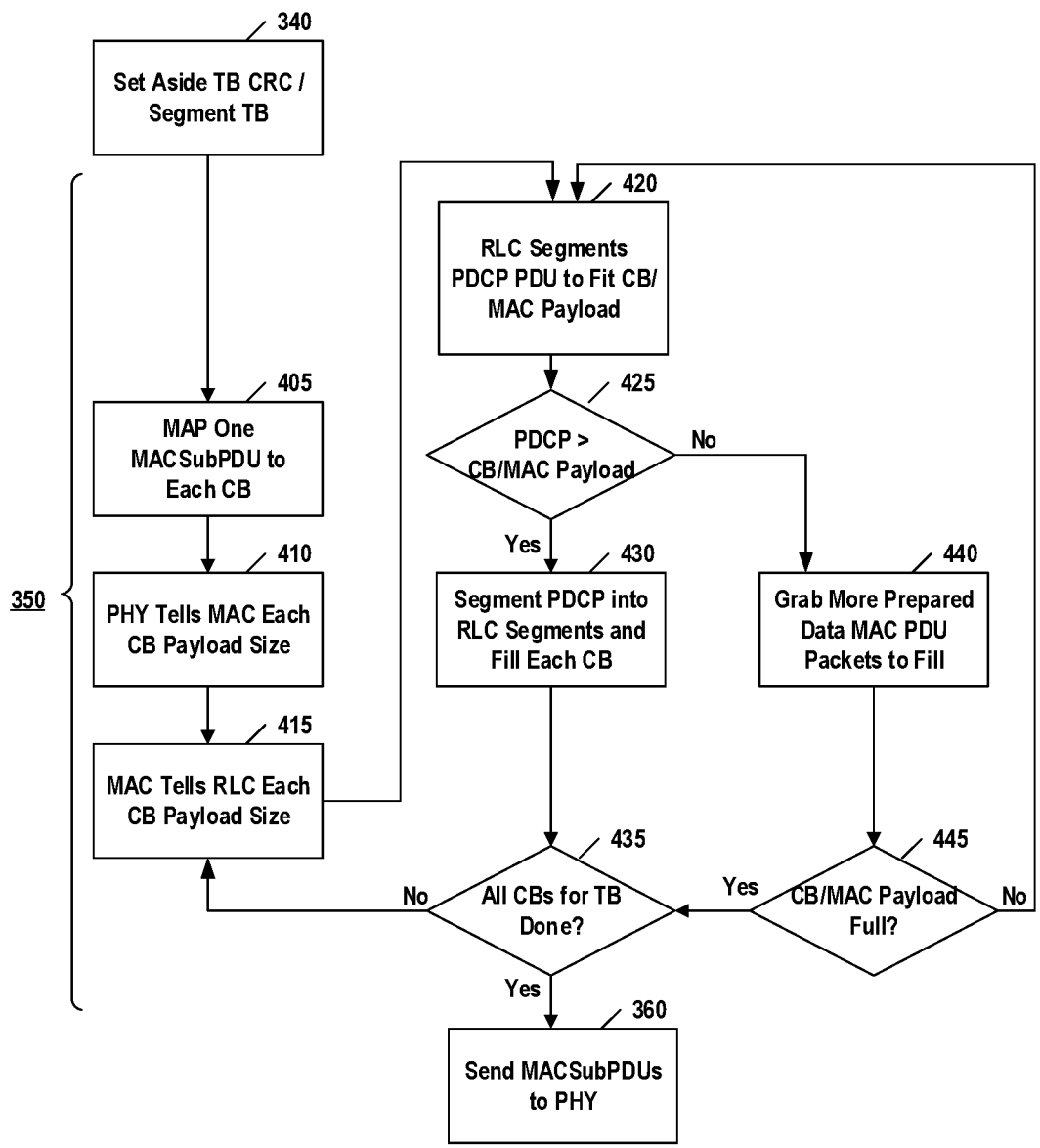
FIG. 4 illustrates additional details of the method shown in FIG. 3.
Figure 5:
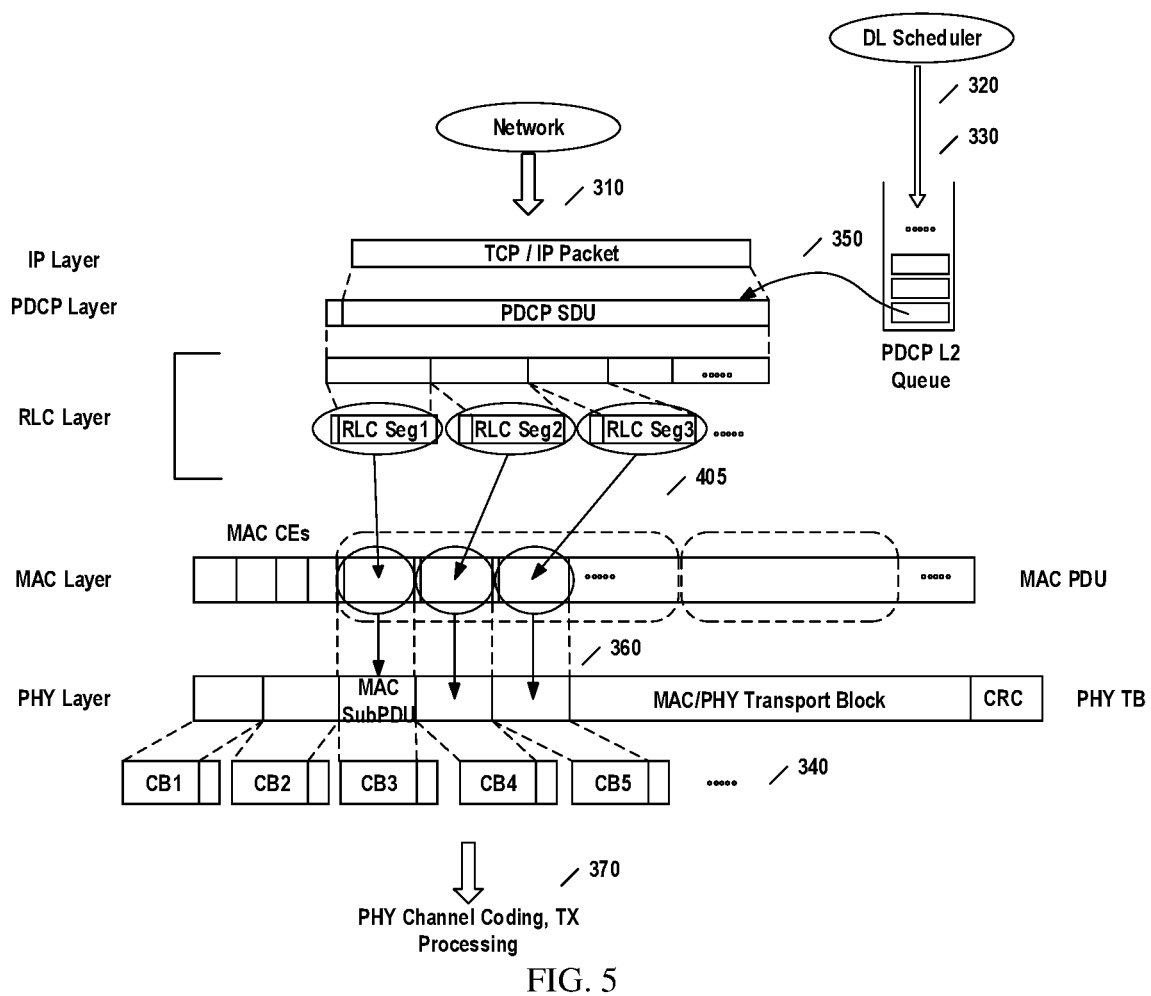
FIG. 5 illustrates an exemplary packet flow within a protocol stack corresponding to an implementation of the method shown in FIG. 3 and expanded in FIG. 4.

FIG. 3 illustrates an exemplary method 300 for efficient data transmission according to certain embodiments of the present disclosure. FIG. 4 illustrates additional details of method 300 shown in FIG. 3. FIG. 5 illustrates an example packet flow within a protocol stack corresponding to an implementation of method 300 shown in FIG. 3 and expanded in FIG. 4. It is understood that the operations shown in method 300 are not exhaustive and that other operations can be performed as well before, after, or between any of the illustrated operations. Further, some of the operations may be performed simultaneously, or in a different order than shown in FIG. 3. Method 300 can be implemented by a modem with a PDCP layer processing packets for transmission. As mentioned above, the modem can be provided in a base station on the transmitting side. A corresponding modem can be provided in a user equipment on the receiving side. The modem on each of the transmitting side and the receiving side can include any suitable transceiver, processor, and memory, such as transceiver 1030, processor 1010, and memory 1020 in FIG. 10.

At the base station (BS) or other access node, L3 IP packets can arrive at the L3 layer of the protocol stack. As shown in FIG. 3, starting at operation 310, a PDCP layer of the modem can process and queue packets to channels. For example, the PDCP layer can perform header compression if necessary, as well as integrity checking and ciphering, and can queue the PDCP PDUs to respective L2 logical channels (LCs). In FIG. 5, an example of a TCP/IP packet is illustrated as coming from a network, such as a wireless network, but other implementations are also permitted.

At operation 320, the modem can determine the transport block (TB) grant allocation size. For example, a DL scheduler in the modem can determine TB grant resource allocation for a given TB, based on available resources at the time.

LTE downlink physical resources can be represented as a time-frequency resource grid consisting of multiple resource blocks (RBs). An RB may be the smallest unit of resources that can be allocated to a user. A resource block may, for example, be 180 kHz wide in frequency and may have a duration of 0.5 millisecond (ms), which may correspond to one slot. The resource blocks can be divided into multiple resource elements (RE). On the other hand, a single code block can occupy multiple resource blocks, which may be widely separated physical resource blocks.

Downlink scheduling can rely on various scheduling algorithms, such as a proportional fair (PF) algorithm that aims to balance bit rate and fairness, or DP-VT-MLDWDF, which is a scheduler that aims to maximize the quality of service (QoS) of real-time traffic while sacrificing the performance of non-real-time traffic using a delay priority function. Many other downlink scheduling algorithms exist, and any desired downlink scheduling algorithm can be used.

At operation 330, the DL scheduler of the modem can prepare PDCP PDUs for the TB. The DL scheduler can prepare the PDCP PDUs for sending in the allocated TB size by gathering based on priority the PDCP PDUs from various LCs. For example, the highest priority PDCP PDUs may be gathered first, followed by lower priority PDCP PDUs. Other prioritization mechanisms can be used. For example, a PDCP L2 Queue, such as illustrated in FIG. 5 can be sorted by order of priority, and operation 330 can involve moving packets from the PDCP L2 queue according to the order of priority.

At operation 340, the physical layer (PHY) can set aside TB cyclic redundancy check (CRC) bits and segment the transport block into code blocks. More particularly, the PHY layer can segment the TB into code blocks using TB size, low-density parity-check (LDPC) codes, a channel coding selection algorithm, and so on. The CB size can be given to the MAC layer to compose one MAC SubPDU that fits exactly in the PHY CB. Thus, as illustrated in FIG. 5, each CB (with accompanying CRC bits) can correspond to a given MACSubPDU for the entire MAC/PHY transport block. There can also be additional CRC bits at the end of the PHY transport block, as shown in FIG. 5. Likewise, the MACSubPDUs can correspond to corresponding RLC segments.

Referring to FIG. 3, at operation 350, the modem can map code blocks to MACSubPDUs/RLC segments. Thus, as shown in FIG. 5, RLC Seg1 can map to a MACSubPDU, which can map to CB3. Thus, a one-to-one mapping can be maintained across multiple layers of the protocol stack, including the PHY layer.

As mentioned above, FIG. 4 illustrates further details of method 300 shown in FIG. 3 according to certain embodiments of the present disclosure. For example, FIG. 4 illustrates more details regarding operation 350 in FIG. 3. As shown in FIG. 4, after setting aside CRC for the TB at operation 340, at operation 405, the modem can map one MAC SubPDU to each CB, as also mentioned above.

At operation 410, the PHY layer can tell the MAC layer each CB payload size. The payload size can refer to the size of the CB, minus the portion of the CB reserved for CRC for that CB itself. Then, at operation 415, the MAC layer can tell the RLC layer each CB payload size. Again, the MAC layer can take into account any additional overhead that may need to be added to the packet at the MAC layer, such as the MAC header. This is one way that the RLC layer in FIG. 5 can properly size the RLC segments to exactly fit and align with the boundaries of the corresponding code blocks.

Referring to FIG. 4, at operation 420, the RLC layer can segment the PDCP PDU into RLC segments to fit the CB and MAC SubPDU payload. The RLC layer can retrieve each PDCP PDU in the TB queue, break down the PDCP PDU into RLC segments, add an RLC segment header to each RLC segment, and send the RLC segments to the MAC layer to be packaged in one MACSubPDU per RLC segment.

At operation 425, a comparison can be made between the PDCP PDU and the CB/MAC payload. In case one PDCP PDU is larger than one MACSubPDU (CB), the "yes" path from operation 425, at operation 430, the modem can segment the PDCP into RLC segments and fill each CB. For example, a first portion of the PDCP PDU can be put into a first RLC segment, and a next portion of the PDCP PDU can be put into the next RLC segment. This can carry on until all the RLC segments/MACSubPDUs in the TB are filled up. For example, at operation 435, there can be a determination as to whether all CBs for the TB are filled. If not, the method 300 can loop back to operation 415, described above.

If the PDCP is less than the CB/MAC payload, illustrated as the "no" path from operation 425 in FIG. 4, then at operation 440, the modem can grab more prepared data MAC PDU packets to fill. At operation 445, a determination can be made as to whether the CB/MAC payload is full. If not, the method can proceed back to operation 420. If the CB/MAC payload is full, the modem can proceed to the checking at operation 435, mentioned above, namely checking with all CBs for the TB are full. When they are all full, illustrated as the "yes" path from operation 435, the modem can proceed to operation 360 shown both in FIG. 4 and FIG. 3. As shown in FIG. 5, a single MAC PDU may include multiple PDCP service data units (SDUs), shown by the dashed ovals. Thus, for example, CB3, CB4, and CB5 may be the first three CBs for the illustrated PDCP SDU, while CB1 and CB2 may be code blocks for other purposes, such as for the MAC control elements (CEs) as illustrated.

Referring back to FIG. 3, operation 360 can follow operation 350. At operation 360, the modem can send the MACSubPDUs to the PHY layer. The modem can also package the MACSubPDUs, for example, by adding a MAC header. Once the MAC layer provides the MACSubPDUs to the PHY layer, at operation 370, the PHY layer can process the CBs and transmit the TB as a whole. For example, the PHY layer can continue with LDPC Channel Coding per CB, and further PHY layer processing, and can send the TB to the UE.

Figure 6:
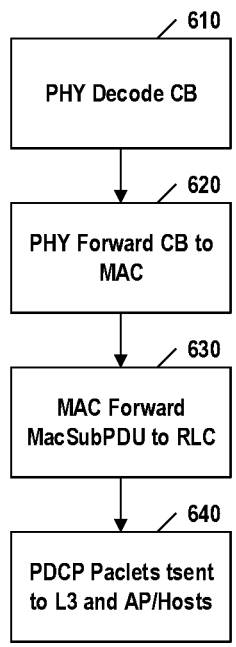
FIG. 6 illustrates an exemplary method for efficient data transmission according to certain embodiments of the present disclosure.
Figure 7:
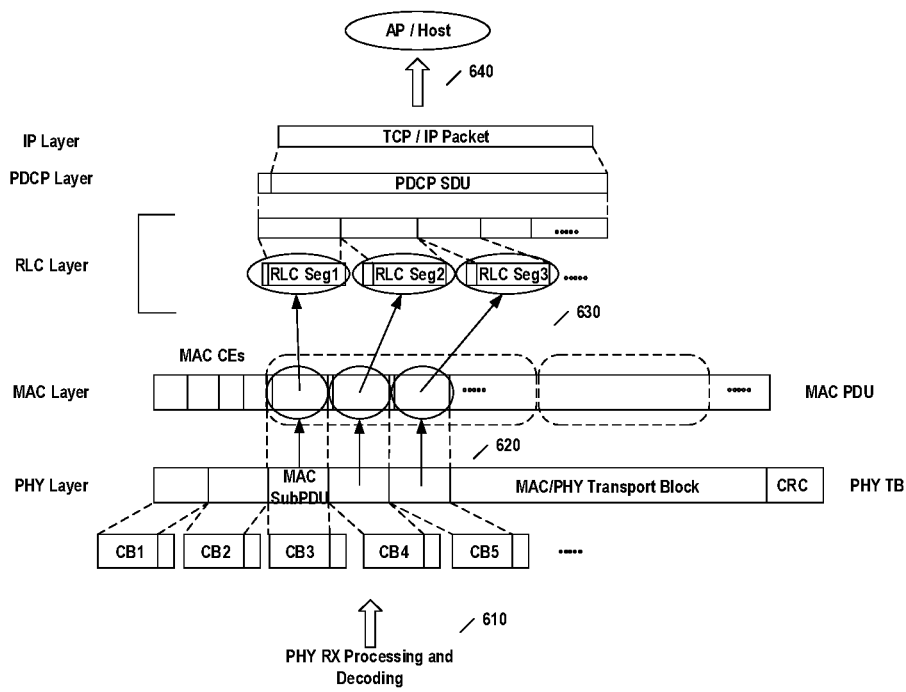
FIG. 7 illustrates an exemplary packet flow within a protocol stack corresponding to an implementation of the method shown in FIG. 6.

FIG. 6 illustrates an exemplary method 600 for efficient data transmission according to certain embodiments of the present disclosure. Method 600 can operate together with method 300, where method 300 is a transmission method, and method 600 is a corresponding reception method to receive a packet transmitted by method 300. FIG. 7 illustrates an exemplary packet flow within a protocol stack corresponding to an implementation of method 600 shown in FIG. 6.

At operation 610, the PHY layer of a UE modem can decode a received CB. The CB can be a CB sent from a base station serving the UE. Thus, for example, operation 610 can be a next operation after method 300. More specifically, the PHY layer can decide a TB, which can be composed of individual CBs. For example, FIG. 7 illustrates CB1, CB2, CB3, and so on.

At operation 620, the PHY layer can forward each successfully decoded CB to the MAC layer. More particularly, once the PHY has decoded each CB successfully, the PHY forwards the decoded CB to the MAC layer. Because each CB is mapped to one MACSubPDU, as shown in FIG. 7, the MAC layer can do a fast decode of the header of each MACSubPDU to extract the payload immediately without waiting for more CBs to arrive from the PHY layer.

At operation 630, the MAC layer can forward each MACSubPDU to the RLC layer. More particularly, once the RLC layer receives each MACSubPDU payload from MAC, the RLC layer can decode the RLC header immediately to extract the RLC segment in the payload. As shown in FIG. 7, the RLC layer can collect multiple RLC segments, for example, RLC Seg1, RLC Seg2, and so on, and can reassemble a PDCP packet. At operation 640, once the PDCP packets are successfully decoded, the modem can continue processing up to L3 and beyond to the AP/Host and so on.

Various modifications above the above approaches may be made. For example, a MACSubPDU boundary could be modified to fit into a hybrid automatic repeat request (HARQ) transmission unit, such as a code block group (CBG). This can be applied where the PHY layer forwards units in CBGs after HARQ success, instead of after individual CB decode. Likewise, while the above discussion has focused on the DL processing, a similar approach could be provided for UL MAC processing.

As an example of a user equipment that implements the efficient decoding scheme described above, such as shown in FIGS. 6 and 7, FIG. 8 illustrates a block diagram of an exemplary terminal device 800 for efficient decoding, according to some embodiments of the present disclosure. Terminal device 800 may include a processor 802, a memory 804, and a transceiver 806, which may be examples of processor 1010, memory 1020, and transceiver 1030 described below in detail with respect to FIG. 10. In some embodiments, some or all of processor 802, memory 804, and transceiver 806 may be integrated on a baseband SoC (also known as a modem SoC or a baseband model chipset). It is understood that in some examples, processor 802 and transceiver 806 may not be integrated on the same SoC, but instead on separate chips. For example, processor 802 and memory 804 may be integrated on a baseband chip (also known as a modem chip), and transceiver 806 may be on a separate transceiver chip or integrated with RF front-end on an RF SoC.

Figure 8:
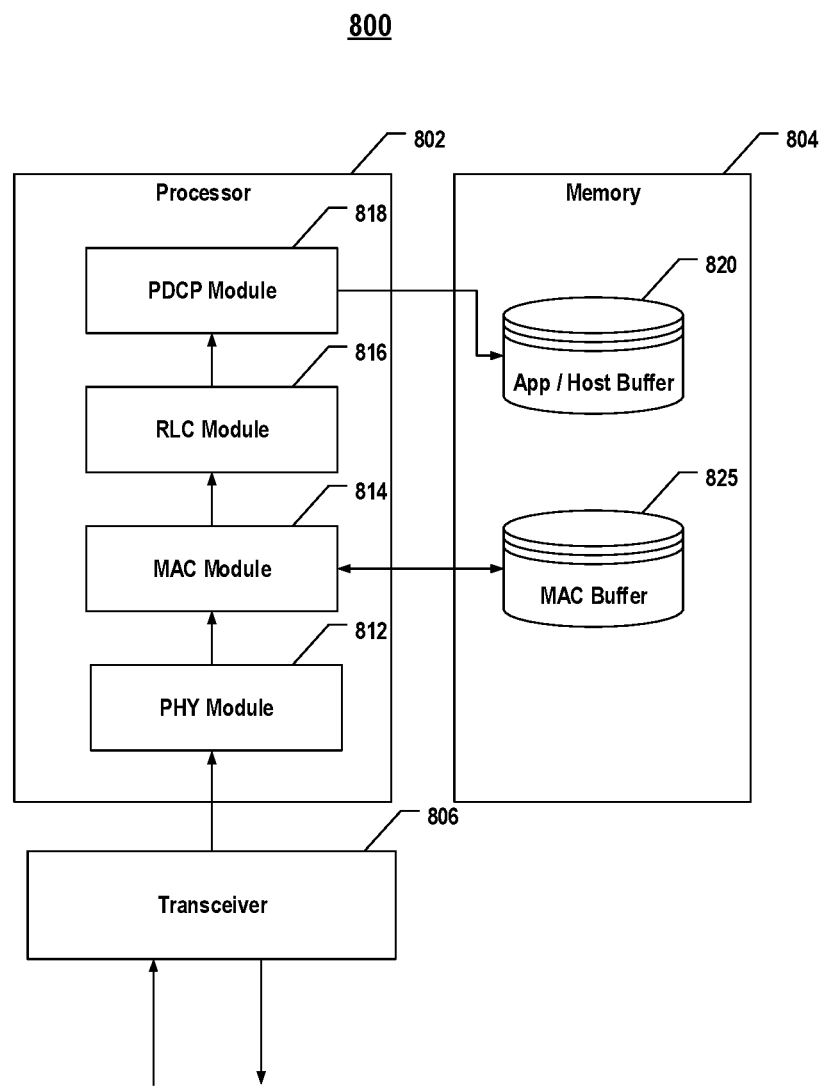
FIG. 8 illustrates a block diagram of an exemplary terminal device for efficient decoding, according to some embodiments of the present disclosure.

As shown in FIG. 8, terminal device 800 may include multiple modules implemented as software and/or firmware modules executed by processor 802, including, for example, a PHY module 812, a MAC module 814, an RLC module 816, and a PDCP module 818. As described above, processor 802 may run an operating system, such as an RTOS, that executes instructions stored in memory 804 (e.g., an on-chip RAM) to implement the above-mentioned software and/or firmware modules. It is understood that in some examples, one or more of the above-mentioned software and/or firmware modules may be implemented as dedicated hardware elements in the SoC as well. Mapping to the LTE layer architecture, the implementation of the above-mentioned modules may be at the protocol stack layer or the physical layer. Terminal device 800 may also include various buffers or other information stored in memory 804 (e.g., an off-chip RAM or external storage), such as a MAC buffer 825 that stores packet data for the operation of the MAC module 814 and App/Host Buffer 820 that stores packet data and other information for applications and other aspects of terminal device 800. Certain embodiments of the present disclosure may reduce the size of MAC buffer 825. Transceiver 806 may be configured to receive signals from the network, such as access node 220 in FIG. 2.

PHY module 812 may be for decoding a physical layer code block or a physical layer code block group. For example, each code block can be decoded individually and passed up, or a plurality of code blocks of a code block group can be decoded together and passed up. For example, PHY module 812 may decode, at a physical layer, a physical layer code block or a physical layer code block group. The size of the physical layer code block or the physical layer code block group can be aligned with the size of a packet or a sub-packet, at an upper layer of a protocol stack comprising the physical layer. More particularly, alignment of the size of the physical layer code block or the physical layer code block group with the size of the packet or the sub-packet can include a one-to-one relationship between the physical layer code block or the physical layer code block group and the packet or the sub-packet. The number of bytes of the physical layer code block or the physical layer code block group may be larger than the number of bytes of the packet or the sub-packet, because, for example, header information and other overhead bytes or bits may be included. Any layer from the MAC layer up may be considered an "upper layer," with respect to the PHY layer.

MAC module 814 may be an adjacent module logically above PHY module 812. MAC module 814 may be for decoding a MAC sub-packet corresponding to the decoded physical layer code block or the physical code block group without waiting for any subsequent physical layer code blocks to be decoded. MAC module 814 may be further configured to pass the decoded MAC sub-packet up the protocol stack. The MAC sub-packet can be a downlink MAC sub-packet. More particularly, the MAC sub-packet can be a MAC sub-protocol data unit (MACSubPDU) packet.

MAC module 814 may be configured to receive the decoded MAC sub-packet and pass a payload of the MAC sub-packet up the protocol stack without waiting for a subsequent MAC sub-packet to be decoded. For example, the passing the MAC sub-packet up the protocol stack can involve MAC module 814 and RLC module 816 each reading and removing a layer-specific header for a respective layer of the protocol stack and passing a payload portion of the MAC sub-packet to an adjacent layer of the protocol stack. For example, MAC module 814 can remove a MAC header, and the RLC module 816 can remove an RLC header. PDCP module 818 can receive a PDCP packet from RLC module 816, which can correspond to the payload of an RLC packet received at RLC module 816 from MAC module 814.

As an example of a user equipment that implements the efficient decoding scheme described above, such as shown in FIGS. 3-5, FIG. 9 illustrates a block diagram of an exemplary access node 900 for efficient transmission, according to some embodiments of the present disclosure. Access node 900 may include a processor 902, a memory 904, and a transceiver 906, which may be examples of processor 1010, memory 1020, and transceiver 1030 described below in detail with respect to FIG. 10. In some embodiments, some or all of processor 902, memory 904, and transceiver 906 may be integrated on a baseband SoC (also known as a modem SoC or a baseband model chipset). It is understood that in some examples, processor 902 and transceiver 906 may not be integrated on the same SoC, but instead on separate chips. For example, processor 902 and memory 904 may be integrated on a baseband chip (also known as a modem chip), and transceiver 906 may be on a separate transceiver chip or integrated with RF front-end on an RF SoC.

Figure 9:
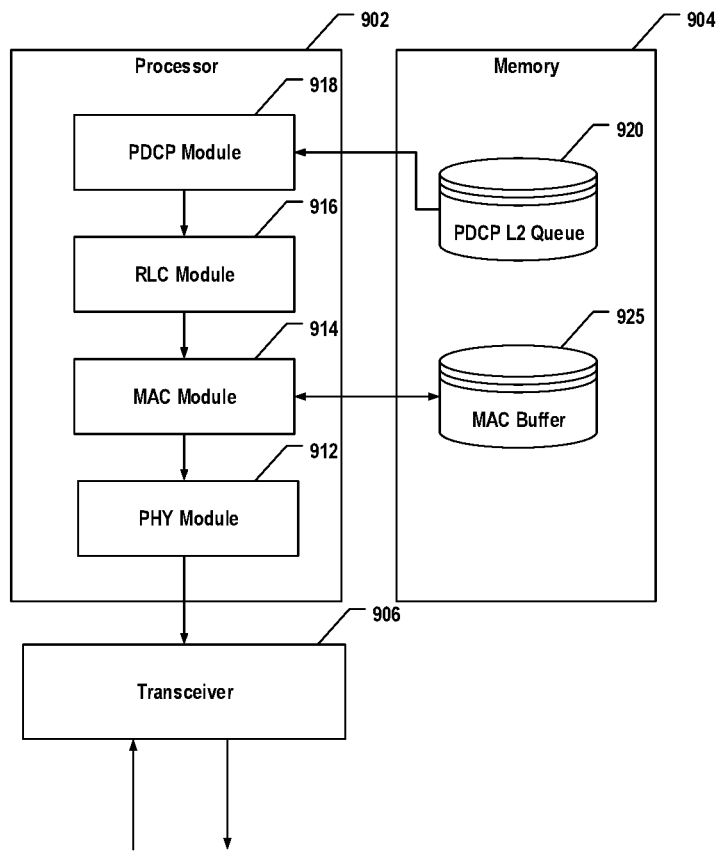
FIG. 9 illustrates a block diagram of an exemplary access node for efficient transmission, according to some embodiments of the present disclosure.

As shown in FIG. 9, access node 900 may include multiple modules implemented as software and/or firmware modules executed by processor 902, including, for example, a PHY module 912, a MAC module 914, an RLC module 916, and a PDCP module 918. As described above, processor 902 may run an operating system, such as an RTOS, that executes instructions stored in memory 904 (e.g., an on-chip RAM) to implement the above-mentioned software and/or firmware modules. It is understood that in some examples, one or more of the above-mentioned software and/or firmware modules may be implemented as dedicated hardware elements in the SoC as well. Mapping to the LTE layer architecture, the implementation of the above-mentioned modules may be at the protocol stack layer or the physical layer. Access node 900 may also include various buffers or other information stored in memory 904 (e.g., an off-chip RAM or external storage), such as a MAC buffer 925 that stores packet data for the operation of MAC module 914 (similar buffers may be provided for the modules of other layers) and PDCP L2 queue 920 that stores packet data units corresponding to, for example, TCP/IP packets received over a network at access node 900. Certain embodiments of the present disclosure may reduce the size of MAC buffer 925 or reduce the frequency of relying on buffers for higher layers of the protocol stack. Transceiver 906 may be configured to send signals over the network to terminals, such as user equipment 210 in FIG. 2.

PDCP module 918 may be for aligning a sub-packet with a physical layer boundary. A packet can include the sub-packet and a plurality of other sub-packets. The properly aligned first sub-packet can be passed down the protocol stack to RLC module 916, which can add RLC headers. Similarly, the sub-packet can be further passed down the protocol stack to MAC module 914, which can MAC headers. When MAC module 914 has a complete MAC PDU, the MAC PDU can pass the sub-packet with the remainder of the sub-packets to PHY module 912.

PHY module 912 can forward the sub-packet bounded by the physical layer boundary for transmission, for example, by providing a complete TB to the transceiver 906. The sub-packet can be a downlink sub-packet, for example, a downlink MACsubPDU. The physical layer boundary can be at least one of a code block boundary or a code block group boundary. In most of the discussion above, the focus is on using a single code block boundary, but in certain embodiments, a code block group can be treated as a unit. This approach may provide more HARQ flexibility, although it may not have the same buffer advantages at the MAC layer.

PDCP module 918 may further be configured to receive a plurality of layer 3 packets for communication, generate packet data units based on the received layer 3 packets, and queue the packet data units in layer 2 logical channels. The aligning the sub-packet can include aligning one of the packet data units in one of the layer 2 logical channels, as shown, for example, in FIG. 5. The packet data units can be packet data convergence protocol (PDCP) packet data units. An upper protocol module, for example, RLC module 916 or PDCP module 918 can be configured to align the sub-packet by a process that includes segmenting a transport block into code blocks taking to account a bit amount of cyclic redundancy check bits. The segmenting can include identifying a code block size by PHY module 912, providing the code block size to MAC module 914, and composing a plurality of MAC SubPDU packets by MAC module 914 corresponding to the code block size.

Figure 10:
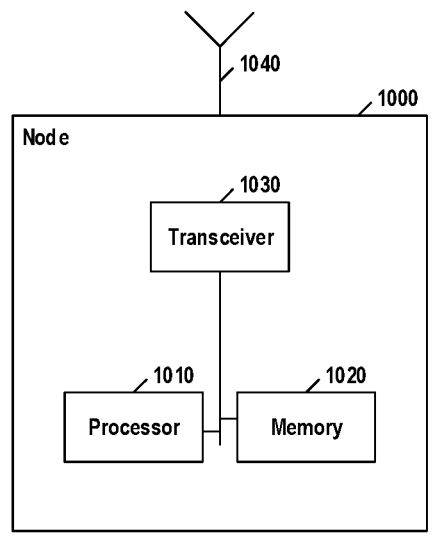
FIG. 10 illustrates a device according to certain embodiments of the present disclosure.

The modules of FIGS. 8 and 9 can be variously implemented in hardware alone or hardware running software, such as computer-program instructions being stored in a memory and being run on a hardware processor. FIG. 10 provides a possible device for implementing such modules. Various modules can be combined or re-arranged. The above-illustrated examples are just illustrative and not limiting.

FIG. 10 illustrates a device according to certain embodiments of the present disclosure. As shown in FIG. 10, a node 1000 can include various components. Node 1000 can correspond to user equipment 210, access node 220, or core network element 230 in FIG. 2. In some embodiments, node 1000 corresponds to the modem in user equipment 210, access node 220, or core network element 230 in FIG. 2.

As shown in FIG. 10, node 1000 can include a processor 1010, a memory 1020, and a transceiver 1030. These components are shown as connected to one another by a bus, but other connection types are also permitted. Transceiver 1030 may include any suitable device for sending and/or receiving data. Node 1000 may include one or many transceivers, although only one transceiver 1030 is shown for simplicity of illustration. An antenna 1040 is shown as a possible communication mechanism for node 1000. Multiple antennas and/or arrays of antennas may be utilized. Additionally, examples of node 1000 may communicate using wired techniques rather than (or in addition to) wireless techniques. For example, access node 220 may communicate wirelessly to user equipment 210 and may communicate by a wired connection (for example, by optical or coaxial cable) to core network element 230. Other communication hardware, such as a network interface card (NIC), can be included.

When node 1000 is a user equipment, additional components may also be included, such as a user interface (UI), sensors, and the like. Similarly, node 1000 may be implemented as a blade in a server system when node 1000 is configured as a core network element 230. Other implementations are also possible.

As shown in FIG. 10, node 1000 may include processor 1010. Although only one processor is shown, it is understood that multiple processors can be included. Processor 1010 may be any suitable computational device, such as a central processing unit (CPU), a microcontroller unit (MCU), application-specific integrated circuit (ASIC), field-programmable gate array (FPGA), or the like. Processor 1010 may be a hardware device having one or many processing cores. In some embodiments in which node 1000 corresponds to a modem, processor 1010 may be a baseband processor.

As shown in FIG. 10, node 1000 may also include memory 1020. Although only memory is shown, it is understood that multiple memories can be included. Memory 1020 can broadly include both memory and storage. For example, memory 1020 can include random access memory (RAM) included on the same chip with processor 1010. Memory 1020 can also include storage, such as a hard disk drive (HDD), solid-state drive (SSD), or the like. Other memory types and storage types are also permitted.

Similarly, node 1000 can also be configured as personal computer 250, router 260, tablet 270, database 280, or authentication server 290 in FIG. 2. Node 1000 can be configured to perform any of the above-described methods using hardware alone or hardware operating together with software.

Another aspect of the disclosure is directed to a non-transitory computer-readable medium encoded with instructions that, when executed by at least one processor (e.g., processor 1010 in FIG. 10), perform any processes disclosed herein. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc, a flash drive, or a solid-state drive having the computer instructions stored thereon.

Certain embodiments may have various benefits and/or advantages. Certain embodiments, for example, may eliminate waiting for multiple PHY Code Blocks to be received and decoded for a MAC SubPDU. Additionally, certain embodiments may prevent discarding the whole MACSubPDU packet in cases where just one or a small number of CBs are missing. Furthermore, certain embodiments may provide less latency in decoding MAC packets, because the packets may be passed to the MAC layer and upward more quickly. Also, certain embodiments may reduce the reception error rate at the MAC layer, as errors regarding any given CB will only affect at most once MACSubPDU. Certain embodiments may use less on-chip or external memory because this method may not need to buffer multiple CBs to form MACSubPDUs. Less power may be needed for the entire chipset in certain embodiments due to reduced memory and data movement.

Certain embodiments may be applied to a variety of different communication protocols and radio access technologies. For example, certain embodiments may be applicable for different wireless technologies requiring transmitting large IP layer packets that are not aligned with smaller PHY layer transmission block units, such as 5G, LTE, or future 3GPP or other standards, such as ETSI.

According to one aspect of the present disclosure, an apparatus can include at least one processor and at least one memory including computer program code. The at least one memory and the computer program code can be configured to, with the at least one processor, cause the apparatus at least to decode a physical layer code block or a physical layer code block group. The at least one memory and the computer program code can also be configured to, with the at least one processor, cause the apparatus at least to decode a MAC sub-packet corresponding to the decoded physical layer code block or the physical code block group without waiting for any subsequent physical layer code blocks to be decoded. The at least one memory and the computer program code can further be configured to, with the at least one processor, cause the apparatus at least to pass the decoded MAC sub-packet up the protocol stack.

In some embodiments, the MAC sub-packet can be a downlink MAC sub-packet.

In some embodiments, the MAC sub-packet can be a MACSubPDU packet.

In some embodiments, the at least one memory and the computer program code can be configured to, with the at least one processor, cause the apparatus at least to receive the decoded MAC sub-packet at a media access control layer and pass a payload of the MAC sub-packet up the protocol stack without waiting for a subsequent MAC sub-packet to be decoded.

In some embodiments, the at least one memory and the computer program code can be configured to, with the at least one processor, cause the apparatus at least to pass the MAC sub-packet up the protocol stack by, for each of a plurality of protocol layers of the stack, reading and removing a layer-specific header for a given layer of the protocol stack and passing a payload portion of the MAC sub-packet to an adjacent layer of the protocol stack.

According to another aspect of the present disclosure, a method for code block processing can include decoding a physical layer code block or a physical layer code block group. The method can also include decoding a MAC sub-packet corresponding to the decoded physical layer code block or the physical code block group without waiting for any subsequent physical layer code blocks to be decoded. The method can further include passing the decoded MAC sub-packet up the protocol stack.

In some embodiments, the MAC sub-packet can be a downlink MAC sub-packet.

In some embodiments, the MAC sub-packet can be a MACSubPDU packet.

In some embodiments, the method can include receiving the decoded MAC sub-packet at a media access control layer. The method can also include passing a payload of the MAC sub-packet up the protocol stack without waiting for a subsequent MAC sub-packet to be decoded.

In some embodiments, the passing the MAC sub-packet up the protocol stack can include, for each of a plurality of protocol layers of the stack, reading and removing a layer-specific header for a given layer of the protocol stack and passing a payload portion of the MAC sub-packet to an adjacent layer of the protocol stack.

According to a further aspect of the present disclosure, an apparatus can include at least one processor and at least one memory including computer program code. The at least one memory and the computer program code can be configured to, with the at least one processor, cause the apparatus at least to align a sub-packet with a physical layer boundary. A packet can include the sub-packet and a plurality of other sub-packets. The at least one memory and the computer program code can be configured to, with the at least one processor, cause the apparatus at least to forward for transmission the sub-packet bounded by the physical layer boundary.

In some embodiments, the sub-packet can be a downlink sub-packet.

In some embodiments, the sub-packet can be a MAC SubPDU packet.

In some embodiments, the physical layer boundary can be at least one of a code block boundary or a code block group boundary.

In some embodiments, the at least one memory and the computer program code can be configured to, with the at least one processor, cause the apparatus at least to receive a plurality of layer 3 packets for communication. The at least one memory and the computer program code can also be configured to, with the at least one processor, cause the apparatus at least to generate packet data units based on the received layer 3 packets. The at least one memory and the computer program code can further be configured to, with the at least one processor, cause the apparatus at least to queue the packet data units in layer 2 logical channels. The aligning the sub-packet can include aligning one of the packet data units in one of the layer 2 logical channels.

In some embodiments, the packet data units can include PDCP packet data units.

In some embodiments, the at least one memory and the computer program code can be configured to, with the at least one processor, cause the apparatus at least to align the sub-packet by a process comprising segmenting a transport block into code blocks taking to account a bit amount of cyclic redundancy check bits.

In some embodiments, the segmenting can include identifying a code block size by a physical layer, providing the code block size to a media access control layer, and composing a plurality of MACSubPDU packets in the media access control layer corresponding to the code block size.

According to an additional aspect of the present disclosure, a method for sub-packet alignment can include aligning a sub-packet with a physical layer boundary. A packet can include the sub-packet and a plurality of other sub-packets. The method can also include forwarding for transmission the sub-packet bounded by the physical layer boundary.

In some embodiments, the sub-packet can be a downlink sub-packet.

In some embodiments, the sub-packet can be a MAC SubPDU packet.

In some embodiments, the physical layer boundary can be at least one of a code block boundary or a code block group boundary.

In some embodiments, the method can include receiving a plurality of layer 3 packets for communication. The method can also include generating packet data units based on the received layer 3 packets. The method can further include queuing the packet data units in layer 2 logical channels. The aligning the sub-packet can include aligning one of the packet data units in one of the layer 2 logical channels.

In some embodiments, the packet data units can include PDCP packet data units.

In some embodiments, the aligning the sub-packet can include segmenting a transport block into code blocks taking to account a bit amount of cyclic redundancy check bits.

In some embodiments, the segmenting can include identifying a code block size by a physical layer, providing the code block size to a media access control layer, and composing a plurality of MACSubPDU packets in the media access control layer corresponding to the code block size.

According to a further aspect of the present disclosure, an apparatus can include a physical layer module configured to decode a physical layer code block or a physical layer code block group. The apparatus can also include a MAC module configured to decode a MAC sub-packet corresponding to the decoded physical layer code block or the physical code block group without waiting for any subsequent physical layer code blocks to be decoded, wherein the medium access control module is further for passing the decoded MAC sub-packet up the protocol stack.

In some embodiments, the MAC sub-packet can be a downlink MAC sub-packet.

In some embodiments, the MAC sub-packet can be a MACSubPDU packet.

In some embodiments, the MAC module can be configured to receive the decoded MAC sub-packet and pass a payload of the MAC sub-packet up the protocol stack without waiting for a subsequent MAC sub-packet to be decoded.

In some embodiments, the apparatus can also include an RLC module. The passing the MAC sub-packet up the protocol stack can include the MAC module and the RLC module each reading and removing a layer-specific header for a respective layer of the protocol stack and passing a payload portion of the MAC sub-packet to an adjacent layer of the protocol stack.

In some embodiments, the apparatus can further include a PDCP module. The passing the MAC sub-packet up the protocol stack can include the RLC module passing the payload portion removed at the respective layer to the PDCP module.

According to another aspect of the present disclosure, an apparatus can include an upper protocol module configured to align a sub-packet with a physical layer boundary. A packet can include the sub-packet and a plurality of other sub-packets. The apparatus can also include a physical layer module configured to forward for transmission the sub-packet bounded by the physical layer boundary.

In some embodiments, the sub-packet can be a downlink sub-packet.

In some embodiments, the sub-packet can be a MAC SubPDU packet.

In some embodiments, the physical layer boundary can be at least one of a code block boundary or a code block group boundary.

In some embodiments, the upper protocol module can be further configured to receive a plurality of layer 3 packets for communication, generate packet data units based on the received layer 3 packets, and queue the packet data units in layer 2 logical channels. The aligning the sub-packet can include aligning one of the packet data units in one of the layer 2 logical channels.

In some embodiments, the packet data units can be PDCP packet data units.

In some embodiments, the upper protocol module can be configured to align the sub-packet by a process that includes segmenting a transport block into code blocks taking to account a bit amount of cyclic redundancy check bits.

In some embodiments, the segmenting can include identifying a code block size by the physical layer module, providing the code block size to a media access control module, and composing a plurality of MACSubPDU packets by the media access control module corresponding to the code block size.

In some embodiments, the upper protocol module can include a PDCP module or an RLC module.

According to an additional aspect of the present disclosure, a system can include a first apparatus and a second apparatus. The first apparatus can include at least one first processor and at least one first memory including first computer program code. The at least one first memory and the first computer program code can be configured to, with the at least one first processor, cause the first apparatus at least to align a sub-packet with a physical layer boundary. A packet can include the sub-packet and a plurality of other sub-packets. The at least one first memory and the first computer program code can be configured to, with the at least one first processor, cause the first apparatus at least to forward for transmission the sub-packet bounded by the physical layer boundary. The second apparatus can include at least one second processor and at least one second memory including second computer program code. The at least one second memory and the second computer program code can be configured to, with the at least one second processor, cause the second apparatus at least to decode a physical layer code block or a physical layer code block group. The at least one second memory and the second computer program code can also be configured to, with the at least one second processor, cause the second apparatus at least to decode a MAC sub-packet corresponding to the decoded physical layer code block or the physical code block group without waiting for any subsequent physical layer code blocks to be decoded. The at least one second memory and the second computer program code can further be configured to, with the at least one second processor, cause the second apparatus at least to pass the decoded MAC sub-packet up the protocol stack, wherein the physical layer code block or the physical code block group comprises the sub-packet transmitted from the first apparatus to the second apparatus.

According to yet another aspect of the present disclosure, a computer program product can encode instructions for performing a process. The process can include any of the above-described methods.

According to a further aspect of the present disclosure, an apparatus can include at least one processor and at least one memory including computer program code. The at least one memory and the computer program code can be configured to, with the at least one processor, cause the apparatus at least to decode, at a physical layer, a physical layer code block or a physical layer code block group. The size of the physical layer code block or the physical layer code block group can be aligned with the size of a packet or a sub-packet, at an upper layer of a protocol stack comprising the physical layer.

In some embodiments, alignment of the size of the physical layer code block or the physical layer code block group with the size of the packet or the sub-packet can include a one-to-one relationship between the physical layer code block or the physical layer code block group and the packet or the sub-packet.

The preceding description of the specific embodiments will so reveal the general nature of the present disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The particular arrangements provided are illustrative and without limitation. Accordingly, the functional blocks, modules, and steps may be re-ordered or combined in different ways than in the examples provided above. Likewise, certain embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. An apparatus, comprising:
   at least one processor; and
   at least one memory including computer program code,
   wherein the at least one memory and the computer program code are configured to, with the at least one processor, cause the apparatus at least to:
      decode a physical layer code block or a physical layer code block group;
      decode a medium access control (MAC) sub-packet corresponding to the decoded physical layer code block or the physical code block group without waiting for any subsequent physical layer code blocks to be decoded; and
      pass the decoded MAC sub-packet up a protocol stack;
   wherein a size of the physical layer code block or the physical layer code block group is aligned with a size of the MAC sub-packet, at an upper layer of the protocol stack;
   alignment of the size of the physical layer code block or the physical layer code block group with the size of the MAC sub-packet comprises a one-to-one relationship between the physical layer code block or the physical layer code block group and the MAC sub-packet.

2. The apparatus of claim 1, wherein the MAC sub-packet comprises a downlink MAC sub-packet.

3. The apparatus of claim 1, wherein the MAC sub-packet comprises a MAC sub-protocol data unit (MACSubPDU) packet.

4. The apparatus of claim 1, wherein the at least one memory and the computer program code are configured to, with the at least one processor, cause the apparatus at least to:

receive the decoded MAC sub-packet at a MAC layer; and pass a payload of the MAC sub-packet up the protocol stack without waiting for a subsequent MAC sub-packet to be decoded.

5. The apparatus of claim 1, wherein the at least one memory and the computer program code are configured to, with the at least one processor, cause the apparatus at least to:

pass the decoded MAC sub-packet up the protocol stack by, for each of a plurality of protocol layers of the stack, reading and removing a layer-specific header for a given layer of the protocol stack; and passing a payload portion of the MAC sub-packet to an adjacent layer of the protocol stack.

6. A method for code block processing, comprising:

decoding a physical layer code block or a physical layer code block group;

decoding a medium access control (MAC) sub-packet corresponding to the decoded physical layer code block or the physical code block group without waiting for any subsequent physical layer code blocks to be decoded; and passing the decoded MAC sub-packet up a protocol stack;

wherein a size of the physical layer code block or the physical layer code block group is aligned with a size of the MAC sub-packet, at an upper layer of the protocol stack;

alignment of the size of the physical layer code block or the physical layer code block group with the size of the MAC sub-packet comprises a one-to-one relationship between the physical layer code block or the physical layer code block group and the MAC sub-packet.

7. The method of claim 6, wherein the MAC sub-packet comprises a downlink MAC sub-packet.

8. The method of claim 6, wherein the MAC sub-packet comprises a MAC sub-protocol data unit (MACSubPDU) packet.

9. The method of claim 6, further comprising:

receiving the decoded MAC sub-packet at a media access control layer; and passing a payload of the MAC sub-packet up the protocol stack without waiting for a subsequent MAC sub-packet to be decoded.

10. The method of claim 6, wherein the passing the decoded MAC sub-packet up the protocol stack comprises, for each of a plurality of protocol layers of the stack, reading and removing a layer-specific header for a given layer of the protocol stack and passing a payload portion of the MAC sub-packet to an adjacent layer of the protocol stack.

11. An apparatus, comprising:
at least one processor; and
at least one memory including computer program code, wherein the at least one memory and the computer program code are configured to, with the at least one processor, cause the apparatus at least to:

align a sub-packet with a physical layer boundary, wherein a packet comprises the sub-packet and a plurality of other sub-packets; and forward for transmission the sub-packet bounded by the physical layer boundary.

12. The apparatus of claim 11, wherein the sub-packet comprises a downlink sub-packet.

13. The apparatus of claim 11, wherein the sub-packet comprises a medium access control (MAC) sub-protocol data unit (MACSubPDU) packet.

14. The apparatus of claim 11, wherein the physical layer boundary is at least one of a code block boundary or a code block group boundary.

15. The apparatus of claim 11, wherein the at least one memory and the computer program code are configured to, with the at least one processor, cause the apparatus at least to:

receive a plurality of layer 3 packets for communication;
generate packet data units based on the received layer 3 packets; and
queue the packet data units in layer 2 logical channels,
wherein the aligning the sub-packet comprises aligning one of the packet data units in one of the layer 2 logical channels.

16. The apparatus of claim 15, wherein the packet data units comprise packet data convergence protocol (PDCP) packet data units.

17. The apparatus of claim 11, wherein the at least one memory and the computer program code are configured to, with the at least one processor, cause the apparatus at least to align the sub-packet by a process comprising segmenting a transport block into code blocks taking to account a bit amount of cyclic redundancy check bits.

18. The apparatus of claim 17, wherein the segmenting comprises:

identifying a code block size by a physical layer;
providing the code block size to a MAC layer, and
composing a plurality of MACSubPDU packets in the MAC layer corresponding to the code block size.

19. The apparatus of claim 11, wherein a size of a physical layer code block or a physical layer code block group is aligned with a size of the sub-packet, at an upper layer of a protocol stack;

alignment of the size of the physical layer code block or the physical layer code block group with the size of the sub-packet comprises a one-to-one relationship between the physical layer code block or the physical layer code block group and the sub-packet.

* * * * *